(12) United States Patent
Vanne et al.

(10) Patent No.: US 10,937,142 B2
(45) Date of Patent: Mar. 2, 2021

(54) ARRANGEMENT FOR GENERATING HEAD RELATED TRANSFER FUNCTION FILTERS

(71) Applicant: OwnSurround Oy, Kuopio (FI)

(72) Inventors: Antti J. Vanne, Los Gatos, CA (US); Tomi A. Huttunen, Kuopio (FI); Jukka O. Antikainen, Kuopio (FI)

(73) Assignee: OwnSurround Oy, Kuopio (FI)

( * ) Notice: Subject to any disclaimer, the term of this patent is extended or adjusted under 35 U.S.C. 154(b) by 59 days.

(21) Appl. No.: 16/357,193

(22) Filed: Mar. 18, 2019

(65) Prior Publication Data

US 2019/0304081 A1 Oct. 3, 2019

(51) Int. Cl.
| | |
|---|---|
| G06K 9/00 | (2006.01) |
| H04N 5/232 | (2006.01) |
| G06T 7/00 | (2017.01) |
| G06K 9/62 | (2006.01) |
| H04S 7/00 | (2006.01) |
| G06K 9/03 | (2006.01) |

(52) U.S. Cl.
CPC ........ *G06T 7/0002* (2013.01); *G06K 9/00221* (2013.01); *G06K 9/00255* (2013.01); *G06K 9/00362* (2013.01); *G06K 9/036* (2013.01); *G06K 9/6202* (2013.01); *H04N 5/23222* (2013.01); *H04S 7/303* (2013.01); *G06T 2207/30168* (2013.01); *G06T 2207/30201* (2013.01); *H04S 2420/01* (2013.01)

(58) Field of Classification Search
CPC ........ A61B 3/1233; A61B 3/102; H04S 7/303
See application file for complete search history.

(56) References Cited

U.S. PATENT DOCUMENTS

| | | | |
|---|---|---|---|
| 6,996,244 | B1 | 2/2006 | Slaney et al. |
| 8,483,450 | B1 | 7/2013 | Derakhshani |
| 9,544,706 | B1 | 1/2017 | Hirst |
| 10,038,966 | B1 | 7/2018 | Mehra |
| 10,149,089 | B1 | 12/2018 | Edry et al. |
| 2003/0074174 | A1 | 4/2003 | Fu et al. |

(Continued)

FOREIGN PATENT DOCUMENTS

| | | |
|---|---|---|
| CN | 104869524 | 8/2015 |
| CN | 104956689 | 9/2015 |

(Continued)

OTHER PUBLICATIONS

Approximating the head-related transfer function using simple geometric models of the head and torso by Algazi, Duda, Duraiswami, Gumerov, and Tang, J. Acoust. Soc. Am., vol. 112, No. 5, Pt. 1, Nov. 2002 (Year: 2002).*

(Continued)

*Primary Examiner* — Joshua L Schwartz
(74) *Attorney, Agent, or Firm* — Womble Bond Dickinson (US) LLP

(57) ABSTRACT

Arrangement for acquiring images for producing a head related transfer function filter is disclosed. In the arrangement the camera of a mobile phone or similar portable device is adjusted for the imaging. All acquired images are analyzed and only suitable images are sent further for producing the head related transfer filter. The arrangement is further configured to provide instructions to the user so that the whole head and other relevant body parts are sufficiently covered.

15 Claims, 2 Drawing Sheets

(56) References Cited

U.S. PATENT DOCUMENTS

| | | |
|---|---|---|
| 2007/0201713 A1 | 8/2007 | Fang et al. |
| 2007/0270988 A1 | 11/2007 | Goldstein et al. |
| 2012/0183161 A1 | 7/2012 | Agevik et al. |
| 2013/0169779 A1 | 7/2013 | Pedersen |
| 2014/0153727 A1 | 6/2014 | Walsh et al. |
| 2014/0343900 A1 | 11/2014 | Goldstein et al. |
| 2015/0010160 A1 | 1/2015 | Udesen |
| 2016/0057552 A1 | 2/2016 | Kure et al. |
| 2016/0100268 A1 | 4/2016 | Stein et al. |
| 2016/0227999 A1* | 8/2016 | An ............... A61B 3/0025 |
| 2017/0153727 A1 | 6/2017 | Park |
| 2018/0091921 A1 | 3/2018 | Silva |
| 2018/0204341 A1 | 7/2018 | Kaneko |
| 2018/0249275 A1 | 8/2018 | Ghorbal et al. |
| 2019/0045317 A1 | 2/2019 | Badhwar et al. |

FOREIGN PATENT DOCUMENTS

| | | |
|---|---|---|
| CN | 107734428 | 2/2018 |
| FR | 3011373 | 4/2015 |
| FR | 3040807 | 3/2017 |
| WO | 03086007 | 10/2003 |
| WO | 2008008730 | 1/2008 |
| WO | 2012028906 | 3/2012 |
| WO | 2013130010 | 9/2013 |
| WO | 2015017914 | 2/2015 |
| WO | 2017047309 | 3/2017 |
| WO | 2017116308 A1 | 7/2017 |
| WO | 2017158232 | 9/2017 |

OTHER PUBLICATIONS

A fast calculation method of the head-related transfer functions for multiple source points based on the boundary element method by Otani and Ise (Accoust. Sci. & Tech. 24, 5 (Year: 2003).*

Finnish Office Action for Finnish Application No. 20165211, dated Jun. 2, 2017, 6 pages.

Finnish Search Report for Finnish Application No. 20165211, dated Nov. 2, 2016, 8 pages.

Finnish Office Action for Finnish Application No. 20165211, dated May 2, 2019, 6 pages.

Jin, C., et al., "Enabling Individualized Virtual Auditory Space Using Morphological Measurements", ResearchGate, Jan. 2000, 5 pages.

International Search Report and Written Opinion for International Application No. PCT/FI2017/050156, dated May 19, 2017, 15 pages.

Sibbing, D., et al., "Markerless Reconstruction of Dynamic Facial Expressions", 2009 IEEE 12th International Conference on Computer Vision Workshops, ICCV Workshops, 2009, pp. 1778-1785.

Guillon, P., et al., "Head-Related Transfer Function Customization by Frequency Scaling and Rotation Shift Based on a New Morphological Matching Method". Audio Engineering Society, Convention Paper 7550, 2008, pp. 1028-1041.

Huttunen, T., et al., "Rapid Generation of Personalized HRTFs", AES 55th International Conference, 2014, pp. 56-61.

Office Action for U.S. Appl. No. 16/516,036 dated Mar. 19, 2020, 13 pages.

Extended European Search Report dated Aug. 7, 2019 for European Patent Application No. 19153780.2; 6 Pages.

Finnish Search Report for FI Application No. 20185300 dated Nov. 13, 2018.

Finnish Office Action for FI Application No. 20185300 dated Nov. 13, 2018.

Dellepiane, M., et al., "Reconstructing head models from photographs for individualized 3D-audio processing," Pacific Graphics, vol. 27, No. 7, 2008, pp. 1719-1727.

Torres-Gallegos, Edgar A. et al., "Personalization of head-related transfer functions (HRTF) based on automatic photo-anthropometry and inference from a database," Applied Acoustics, vol. 95, 2015, pp. 84-95.

Finnish Search Report for FI Application No. 20185678 dated Feb. 26, 2019.

Finnish Office Action for FI Application No. 20185678 dated Feb. 26, 2019.

Final Office Action for U.S. Appl. No. 16/516,036 dated Sep. 24, 2020, 29 pages.

Office Action for Chinese Application No. 201910738957.9 dated Nov. 27, 2020, 14 pages.

* cited by examiner

ARRANGEMENT FOR GENERATING HEAD RELATED TRANSFER FUNCTION FILTERS

This application claim priority to Finnish Application No. FI20185300, filed Mar. 29, 2018.

BACKGROUND

Audio systems with multiple audio channels are commonly known and used by entertainment industry, for example in movies or computer games. These systems are often called Surround Sound systems or three-dimensional sound systems. Recently arrangements for implementing even better three-dimensional sound experience have been introduced. These arrangements do not only have multiple audio channels but provide object-based audio for improving the listening experience.

Typically in headphone listening these arrangements are based on filtering the sound channels using so called head related transfer function filters. The three-dimensional experience is produced by manipulating sounds in headphone's two audio channels so that they resemble directional sounds arriving in the ear-canal. The three-dimensional sound experience is possible by taking into account the effect of pinna, head and torso to the sound that enters to the ear-canal. These filters are often called HRTF-filters (Head-Related Transfer Function). These filters are used to provide an effect that is similar to how a human experiences sounds arriving from different directions and distances. When the anatomy of body parts, such as ears, head and torso, of a person is known a personal HRTF-filter can be produced so that the sound experienced through headphones is as realistic as possible.

The material needed for producing such a filter comprises three-dimensional point cloud coordinates describing the surface point cloud an ear can be achieved by determining three-dimensional point cloud for relevant parts of the ear. In conventional simulation based approach three-dimensional point cloud of body parts are determined by using a three-dimensional scanning device that produces three-dimensional model of at least portion of visible parts of the ear. This requires, however, a costly three-dimensional scanning device that can produce an accurate three-dimensional geometric model of an ear. It is possible to produce two filters so that both ears have their own filters respectively as the ears may be of different geometry.

Conventionally HRTF-filters are pre-produced and for each person a filter selected from a library of acoustically measured or simulated HRTF-filters for a small subset of individuals was chosen, however, because of advancements in technology it is possible to produce personal filters when the anatomy of the person for whom the filter is designed for are known. The anatomy measurements can be done by acquiring enough images or video material showing sufficiently the person to be measured. This, however, is very intensive computationally and for the network connection as longer videos and larger sets of images require lot of space. Furthermore, acquiring these images alone is not easy. This increases the number of required images or the length of the video.

Thus, there is a need for an arrangement capable of acquiring images that are required for producing a HRTF-filter.

SUMMARY

Arrangement for acquiring images for generating a head related transfer function filter is disclosed. In the arrangement the camera of a mobile phone or similar portable device is adjusted for the imaging. All acquired images are analyzed and only suitable images are sent further for producing the head related transfer filter. The arrangement is further configured to provide instructions to the user so that the whole head and other relevant body parts are sufficiently covered.

In an aspect of the invention a method for acquiring images required for producing geometrical data for head related transfer function filters is disclosed. The method comprises initializing a camera application in a user device for controlling a camera module of the user device; acquiring a plurality of images using the camera module; selecting images showing anatomy, which anatomy may be used in producing a head related transfer function filter; determining if the selected images comprises sufficiently anatomy in order to produce the head related transfer function filter; and if the result of the determination is negative the method further comprises: providing instructions to the user for additional acquiring images in order to acquire images of areas that are not sufficiently covered.

The aspect facilitates better production of head related transfer function filters by providing easy acquisition of images that are needed for producing a point cloud that is needed in the production of the filter. Furthermore, the required transfer capacity and computing power needed for producing the filter at the device or at a remote service is reduced. Also, the geometric accuracy of the point cloud is improved when the quality and angular coverage of the images are controlled during the image acquisition.

In an implementation the method further comprises: transmitting each selected image comprising anatomy for producing the head related transfer filter to a head related transfer function filter generation server. It is beneficial to transmit selected images to a server or other computing facility, internal or external, having more computing capacity. When only selected images are sent the amount of data to be transferred is reduced.

In an implementation method further comprises: discarding images that do not comprise geometry that may be used in producing the head related transfer filter. It is beneficial to discard the images that are not used so that memory is freed for other purposes.

In an implementation the method further comprises: preparing the user device for acquiring the images, wherein the preparing comprises at least one of the following: Selecting sufficient resolution; turning on the lighting device of the camera user device; Adjusting exposure time; Selecting appropriate frame rate. It is beneficial to determine suitable settings before acquiring the images. The settings may differ from the settings that the user is preferring for ordinary photography. Thus, the changed images will lead into better images for the purpose and this may reduce the need of figures to be acquired for producing the point cloud.

In an implementation the method further comprises: when providing instructions, at least one of the following: showing visual instructions on the screen of the device; providing voice instructions to the user; providing haptic instructions. It is beneficial to give the user feedback about the success of image acquisition. This facilitates acquisition of better quality images in shorter time.

In an implementation the method further comprises: detecting and/or labelling ear and face landmarks. It is beneficial to detect and label the landmarks as these are the anatomical features that are relevant with regard the production of the filter.

In an implementation the method further comprises: arranging the selected images into at least three data sets, wherein the sets comprise: Images of head and upper torso; Images of the left ear; and Images of the right ear. It is beneficial to acquire images from all body parts that have a significance for the filter. This will improve the quality of the filter.

In an implementation the selecting is based on at least one of the following: Visibility of chosen anatomic feature; Quality of the image; Angular coverage of the images. It is beneficial that the selection of the images can be based on various qualitative measures so that the images are both good and show relevant parts.

In an aspect a computer program for a server comprising code adapted to cause the method according as described when executed on a data-processing system is disclosed. It is beneficial that the arrangement can be provided as a computer program so that personal devices can easily be used for image acquisition.

In an aspect an apparatus comprising: at least one processor configured to execute computer programs; at least one memory configured to store computer programs and related data; at least one data communication interface configured to communicate with external data communication networks; and at least one imaging device; wherein said apparatus is configured to perform the method according as described above. It is beneficial that the arrangement can be provided as an apparatus so that the users may easily use the apparatus in the image acquisition.

The arrangement for acquiring images for producing a head related transfer function filter described facilitates generation of personally designed head related transfer function filters without costly scanning process. A person wishing to get a personal head related transfer function filter may acquire needed images by using a mobile phone or similar. The arrangement disclosed is efficient as it determines if acquired images are suitable for use and transmits only the images that can be used. This not only reduces the need for data transfer but also provides more reliable results. In an alternative example the images are provided to an application within the same device. In this approach the process reduces the needed computing power so that it is possible to do such computations in lower computing capacity devices. Furthermore, when less computing capacity is needed the battery of the device will last longer.

When the person acquiring necessary images uses the arrangement disclosed he/she can acquire all necessary images at once. Furthermore, the arrangement is able to provide instant feedback stating if the images acquired are sufficient or not. Thus, the user may rely on the service so that he/she does not need to acquire images several times. This reduces time from order to transmission of final head related transfer filter.

BRIEF DESCRIPTION OF THE DRAWINGS

The accompanying drawings, which are included to provide a further understanding of an arrangement for generating head related transfer function filters and constitute a part of this specification, illustrate embodiments and together with the description help to explain the principles of the arrangement for generating head related transfer function filters. In the drawings.

DETAILED DESCRIPTION

Reference will now be made in detail to the embodiments, examples of which are illustrated in the accompanying drawings.

In the following description a plurality of images has been referred to. In the context of this description the plurality of images may mean a certain number of still images or images that have been extracted from a video stream, or any combination of these two. The plurality of images is needed so that the desired features are seen from different angles so that a three-dimensional point cloud can be determined sufficiently accurately.

Figure 1:
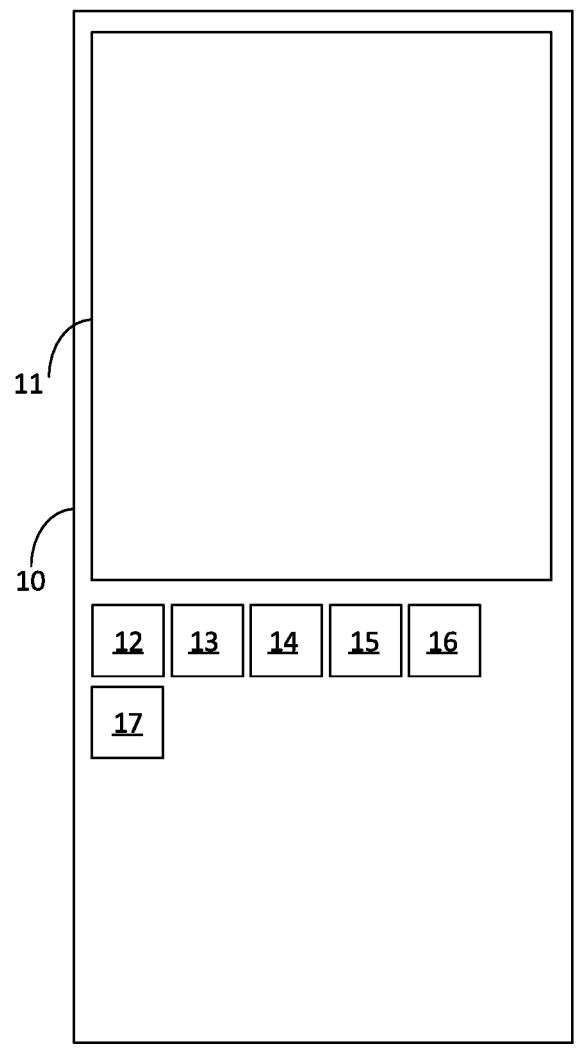
FIG. 1 is an example of an apparatus for generating head related transfer function filters.

In FIG. 1 an example of an apparatus 10 for acquiring images required for producing head related transfer function filter is shown. In the example of FIG. 1 the apparatus 10 is a mobile phone, however, any similar device following the principles discussed below may be used. Examples of such devices include tablet computers, laptop computers and similar.

The mobile phone 10 of FIG. 1 comprises a display 11. The display 11 may be ordinary mobile display, which are typically touch sensitive even if that is not necessary in this example.

The mobile phone 10 further comprises at least one processor 12 that is configured to execute computer programs and applications. The mobile phone further comprises a memory 13 for storing computer programs, applications and related data. Typically mobile phones have both volatile and non-volatile memory. The present example is suitable for both types of memory.

The mobile phone 10 further comprises a data communication interface 14. Examples of such interface are UMTS (Universal Mobile Telecommunications System) and LTE (Long Term Evolution). Mobile phones typically have access to several different network types.

A common feature in a modern mobile phone is a camera 15. The camera comprises at least one lens and at least one image sensor. In case of plurality of lenses and sensor images acquired are combined in order to provide a higher quality image. Typically cameras, such as camera 15 of the mobile phone 10, are capable of acquiring video sequences. In the present example the video sequence can be captured at so called full HD 1080p resolution, which is 1920×1080 pixels. Higher resolutions may also be acquired. In the present example, it is possible to supplement the video sequence by using higher resolution still pictures. Modern cameras may also have capability of producing three-dimensional images, other images including depth information at least for some of the object in the image. The image may further include additional information, such as lighting conditions, device orientation information and other similar information that provides additional information about the figure and the content of the figure. These features may be used in the embodiments described. For example, a depth camera, stereo camera or other range imaging device may be very useful in determining three-dimensional coordinates for the anatomic features that are taken into account when producing a head related transfer function filter.

The mobile phone 10 further comprises an audio device 16. The audio device may comprise a combination of loud speaker and a microphone. The loud speaker may be used also for ordinary calls. The mobile phone 10 further comprises a haptic device 17, which may be used for giving feedback to the user of the mobile phone 10. Such feature is commonly used, for example, by informing the user about incoming call by vibrating alarm.

Figure 2:
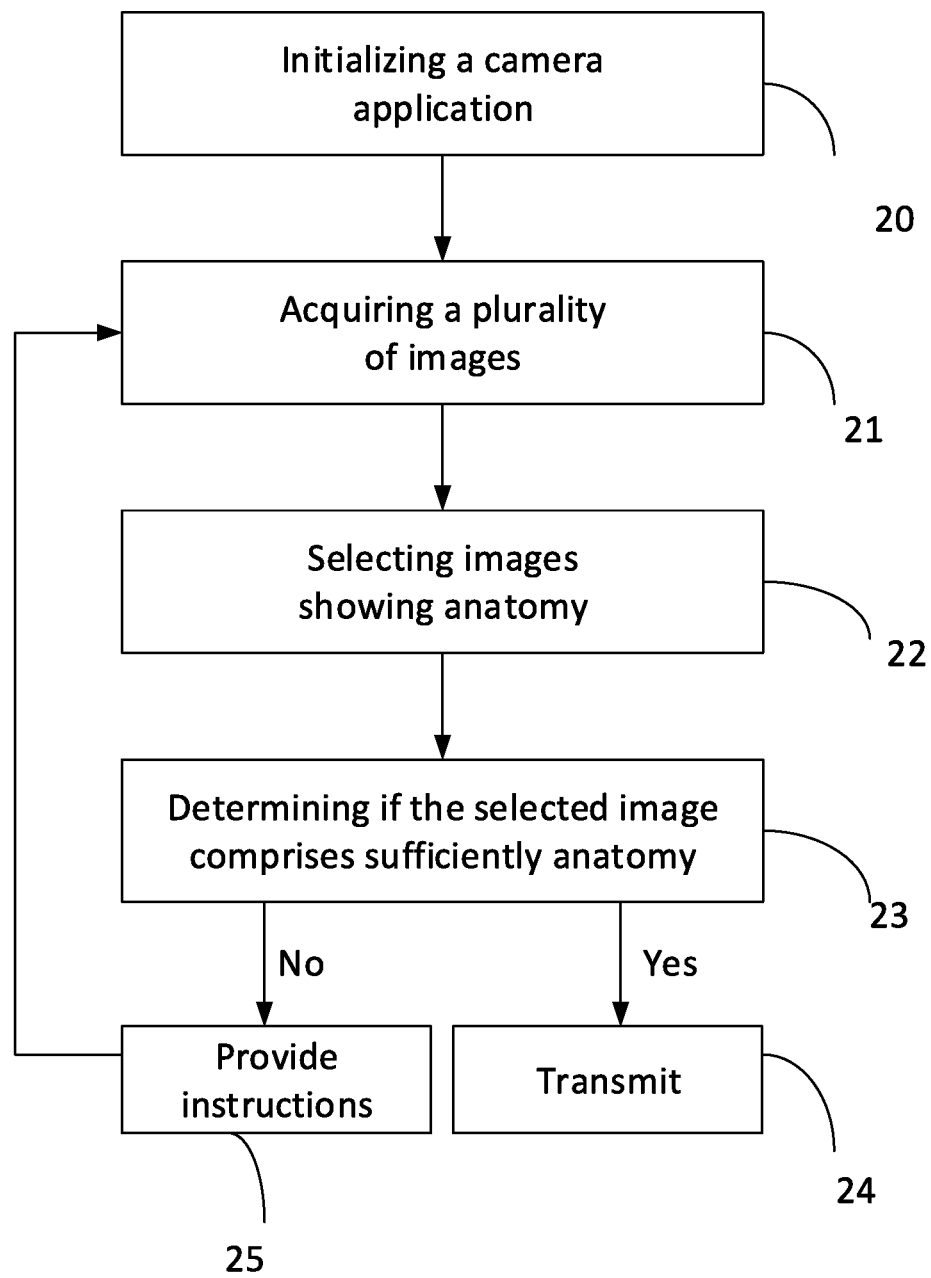
FIG. 2 is an example of a method for generating head related transfer function filters.

In FIG. 2 an example of a method for acquiring images required for producing head related transfer function filter is shown. The method may be used in a device such as the mobile phone 10 of FIG. 1. However, this is only an example and any similar device may be used.

The method is initiated by initializing the camera application, step 20, of the mobile phone. This initialization comprises typically loading and launching the application so that the mobile phone is ready for acquiring images. In the method of FIG. 2 this further comprises setting parameters that are appropriate for the purpose.

These may be, for example, choosing a video capturing mode with the highest possible resolution, such as 1920× 1080 or 3840×2160 with an appropriate frame rate. The frame rate does not need to be suitable for viewing purposes, however, higher frame rates provide more material for later use. In addition to frame rate an appropriate exposure time may be chosen. If the mobile phone has a lighting device, such as a LED (Light Emitting Diode) or other lamp, that may be turned on in order to improve capturing. Even if several presetting options exists all of them need not to be used. The purpose of settings is to improve the capturing the features necessary for the filter production. Thus, acceptable image is such that facilitates the extraction of the features from image and it does not necessarily look good for human eye. For example, when choosing the optimal exposure time it is important that the important pixels are not over or under exposed.

When settings have been appropriately set a plurality of images are acquired, step 21. The user of the mobile phone 10 uses the camera 15 of the mobile phone 10 to acquire a plurality of images. These images may be acquired in still mode or as a video stream. It is possible to provide instructions to the user, for example, to acquire images of the left ear first. After images have been acquired, for example a certain period of video stream or a predetermined number of images has been achieved the imaging is stopped. The camera stores acquired images to the memory 13. In more advanced implementations the stopping condition may be dependent on quality, imaging conditions or other similar. For example, it is possible to acquire images until a predetermined angular coverage has been achieved.

From acquired images required for determining a head related transfer function are selected, step 22. Images in the memory 13 are processed by a processor 12 in order to determine if the images are usable. Furthermore, some of the images may be deemed to be not usable because earlier images already cover sufficiently that area.

There are several optional steps that may be taken when selecting images for transmitting further. Firstly, each of the images may be processed in order to check technical quality. This may include, for example, checking if the images are sharp and appropriately exposed. In this process automatic correction algorithms may be used in order to check it is possible to improve the images. The sharpness is evaluated, for example, using the variance of the Laplacian filter. In focus frames produces higher variances than blurred ones. Frame selection is defined using dynamic threshold level (average variance of the video). If the sampling rate is not sufficient the threshold level is decreased until the requested frame rate is achieved.

The lighting and exposure may be verified by analyzing the highest pixel intensity on the target to verify that there is no over exposure. This step corresponds with the analysis for choosing the correct exposure.

After technical check localization of the desired body parts, such as ears, face and head, is performed on the images that passed the technical check is a technical check was applied.

Ears and face are detected using a (machine learning) feature detection method, such as the CNN (convolutional neural network). Detectors are pre-trained with selected datasets, which typically consists of a large number of image samples n>1000 images.

It is possible that during the video capture, a feature detection method is used to detect the ear and it's ROI (region of interest) is drawn on the image. Face and ear landmarks are detected from the ROI using pre-trained shape model and they are tracked during the capture process. If the ear or face location and features cannot be detected, the application gives feedback to the user and guides the user to adjust the camera position according previously detected features.

The graphical user interface can guide the user to acquire a plurality of images, such as a video, from a right distance and direction. This can be done, for example, by showing a silhouette of a head or ear on the screen of the mobile device. The user is advised to place the head or ear inside the silhouette while shooting the video. Also, the silhouette may rotate to guide the user change to the shooting direction. The direction to which the camera needs to be moved can indicated with arrows on the screen.

The feedback described above is applicable only when the person acquiring the plurality of images can see the instructions. This typically happens only when another person is responsible of the Acquiring. In the case of unassisted acquiring, instead of the visual information, haptic and/or audio feedback may be given. Furthermore, all visual, haptic and audio feedback may be combined or used alone so that the best possible form of assistance can be provided.

For detected body parts an on-line visibility detection must be applied. Hairs over the ear will affect to the final reconstruction and therefore these situations will be detected and the user will be informed about the issue. The detection is done from the ROI detected using the methods explained above.

At first the ear region is segmented using color information. Color based segmentation can be done, e.g., using neural networks which improve the segmentation results. An edge detection, such as the Canny method, is applied to the segmented frame which detects thin hairs over the ear. If unwanted hairs are detected the application will inform the user to remove hairs on the ear.

After the images have been selected the processor 12 is configured to determine if the selected images are sufficient for determining a head related transfer function filter, step 23. In order to perform this the processor 12 may perform a sparse reconstruction of head/ears.

The sparse reconstruction refers to a point cloud or surface model which is not accurate enough for the HRTF processing, however it is sufficient for providing an estimate if the images are accurate enough when the final reconstruction is to be done using computing device having the capability to provide such reconstruction. A sparse point cloud is generated on-line using, for example, a fast simultaneous localization and mapping (SLAM) method. The surface model can be generated using a morphable shape model that is generated, e.g. using a principal component analysis (PCA). When performing sparse reconstruction features from the acquired video stream or images are extracted and tracked. Tracked features are used to improve the estimate on camera position and angle. The use of information received from additional mobile phone sensors, such as gyroscope and accelerometer, may be used to improve camera localization and absolute scaling.

At this stage it is possible to provide instructions for the user to acquire more images if necessary. The quality of the sparse reconstruction can be analysed, for example, by comparing the original images from the camera to virtual images generated from the sparse 3d reconstruction. If the features of the sparse reconstruction (such as contours of the ear) do not agree with the original images, the user is instructed to acquire more images. However, it is also possible to try to determine if it is possible to create three sufficient sets, step 23. In this example there is a set for the head and both ears, however, it is possible to include a separate additional sets, for example, for the body of the user. Correspondingly, it is possible to create lower quality filters by including only sets for ears.

If the sets are not sufficient the method proceeds back to acquiring images with instructions, step 21. If the images are sufficient, then the acquired images are sent to a server, cloud service of similar for producing the actual head related transfer filter. The information acquired from the sparse construction may be sent together with images.

If the sets are sufficient the method proceeds to transmit the selected images further, step 24. Transmitting images further may mean transmitting the images to an external device or service, such as a computer, server or a cloud service. However, transmitting further to an additional application that is executed in the device used for acquiring images. For example, a mobile phone application can be configured so that the demanding computing is done in the background, possibly during low activity period such as night, and when the device is possibly connected to a charger. Thus, the complicated process can be done even in a low computing capacity device.

In the example above the method is illustrated as a sequence of steps, however, the process does not need to be sequential but can be implemented at least partially parallel. For example, when the user starts acquiring images the processing of the first video frame may start immediately. Thus, it is possible that information and instructions can be provided to the user immediately from the beginning.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, or any other suitable medium from which a computer can read.

It is obvious to a person skilled in the art that with the advancement of technology, the basic idea of an arrangement for generating head related transfer function filters may be implemented in various ways. The arrangement for generating head related transfer function filters and its embodiments are thus not limited to the examples described above; instead they may vary within the scope of the claims.

What is claimed is:

1. A method for acquiring images required for producing geometrical data for head related transfer function filters comprising:

initializing a camera application in a user device for controlling a camera module of the user device;

acquiring a plurality of images using the camera module;

selecting images showing anatomy, which anatomy may be used in producing a head related transfer function filter;

determining if the selected images comprises sufficient anatomy in order to produce the head related transfer function filter, wherein a result of the determination is negative when a visibility detection process that is applied to a detected ear has detected hairs over the detected ear; and if the result of the determination is negative the method further comprises: providing instructions to the user to remove hairs on the detected ear and acquire additional images of areas that are not sufficiently covered in the selected images.

2. A method according to claim 1, wherein the method further comprises: transmitting each selected image comprising anatomy for producing the head related transfer filter to a head related transfer function filter generation server.

3. A method according to claim 1, wherein the method further comprises: discarding images that do not comprise geometry that may be used in producing the head related transfer filter.

4. A method according to claim 1, wherein the method further comprises: preparing the user device for acquiring the images, wherein the preparing comprises at least one of the following:

Selecting sufficient resolution;

Turning on the lighting device of the camera user device;

Adjusting exposure time; and

Selecting appropriate frame rate.

5. A method according to claim 1, wherein the method further comprises, when providing instructions, at least one of the following:

showing visual instructions on the screen of the device;

providing voice instructions to the user; and providing haptic instructions.

6. A method according to claim 1, wherein the selecting further comprises: detecting and/or labelling ear and face landmarks.

7. A method according to claim 6, wherein the method further comprises: arranging the selected images into at least three data sets, wherein the sets comprise:

Images of head and upper torso;

Images of the left ear; and

Images of the right ear.

8. A method according to claim 1, wherein the selecting is based on at least one of the following:

Visibility of chosen anatomic feature;

Quality of the image

Angular coverage of the images.

9. A method for acquiring images needed for producing geometrical data for head related transfer function filters, the method comprising:

initializing a camera application in a user device for controlling a camera module of the user device;

acquiring a plurality of images using the camera module;

selecting images showing anatomy to be used in producing a head related transfer function filter; and determining if the selected images comprise sufficient anatomy to produce the head related transfer function filter wherein a result of the determination is negative in that a visibility detection process that is applied to a detected ear results in detection of hair over the detected ear, wherein if the result of the determination is negative the method further comprises providing instructions to the user for removing hairs that are on the detected ear and for acquiring images of areas that are not sufficiently covered in the selected images.

10. A method according to claim 9, wherein the method further comprises transmitting each selected image that comprises anatomy for producing the head related transfer filter, to a head related transfer function filter generation server.

11. A method according to claim 9 wherein the result of the determination is negative in that ear or face features are not detected, and wherein providing instructions to the user comprises giving audio feedback to the user.

12. A method according to claim 9 wherein determining if the selected images comprises sufficient anatomy comprises performing a sparse 3D reconstruction of head and ears and comparing original camera images to virtual images generated from the sparse 3D reconstruction.

13. An apparatus comprising:
at least one processor (12) configured to execute computer programs;
at least one memory (13) configured to store computer programs and related data;
at least one data communication interface (14) configured to communicate with external data communication networks; and
at least one imaging device (15);
wherein said at least one processor becomes configured by the stored computer programs and related data to receive a plurality of images acquired using the at least one imaging device, and select from the plurality of images those showing anatomy to be used in producing a head related transfer function filter, and determine if the selected images comprise sufficient anatomy to produce the head related transfer function filter wherein a result of the determination is negative in that a visibility detection process that is applied to a detected ear results in detection of hair over the detected ear,
wherein if the result of the determination is negative the processor is configured to provide instructions to the user for removing hairs that are on the detected ear and for acquiring images of areas that are not sufficiently covered in the selected images.

14. The apparatus of claim 13 wherein apparatus is configured to transmit each selected image comprising anatomy for producing the head related transfer filter to a head related transfer function filter generation server.

15. The apparatus of claim 13 wherein the processor is configured to discard images that do not comprise geometry that may be used in producing the head related transfer filter.

* * * * *